Sept. 30, 1924.
H. H. JOHNSTON
CONTROL APPARATUS
Filed March 11, 1919  3 Sheets-Sheet 1
1,509,954
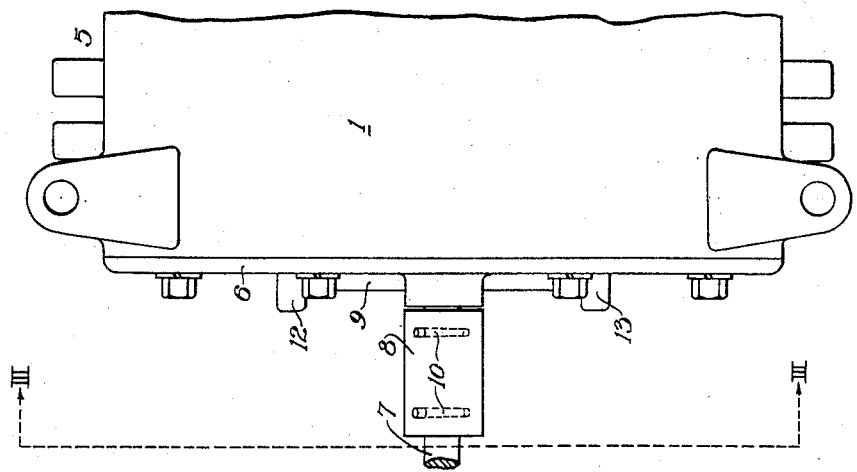
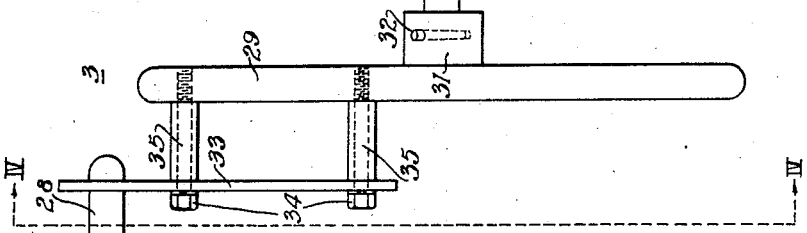
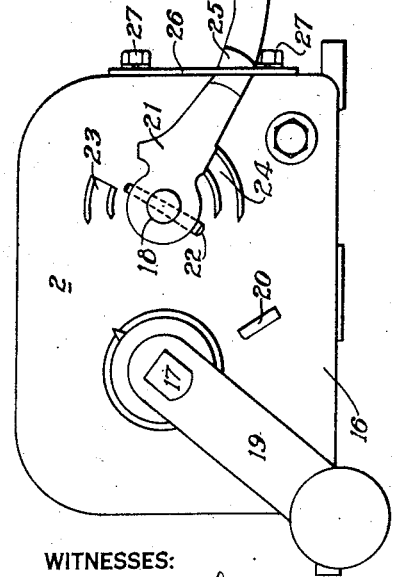
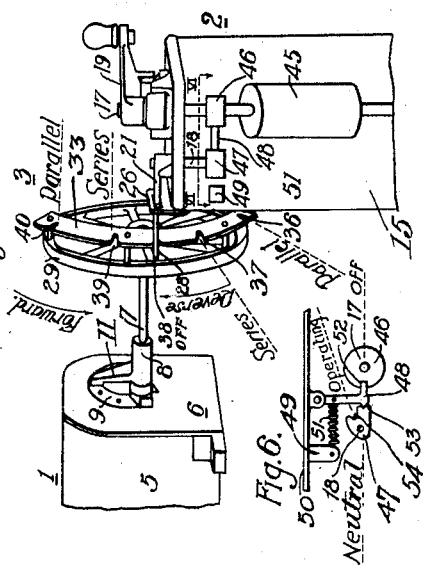
WITNESSES:
H.B.Funk.
W.R.Coley
INVENTOR
Howard H. Johnston.
BY
Charley Carr
ATTORNEY

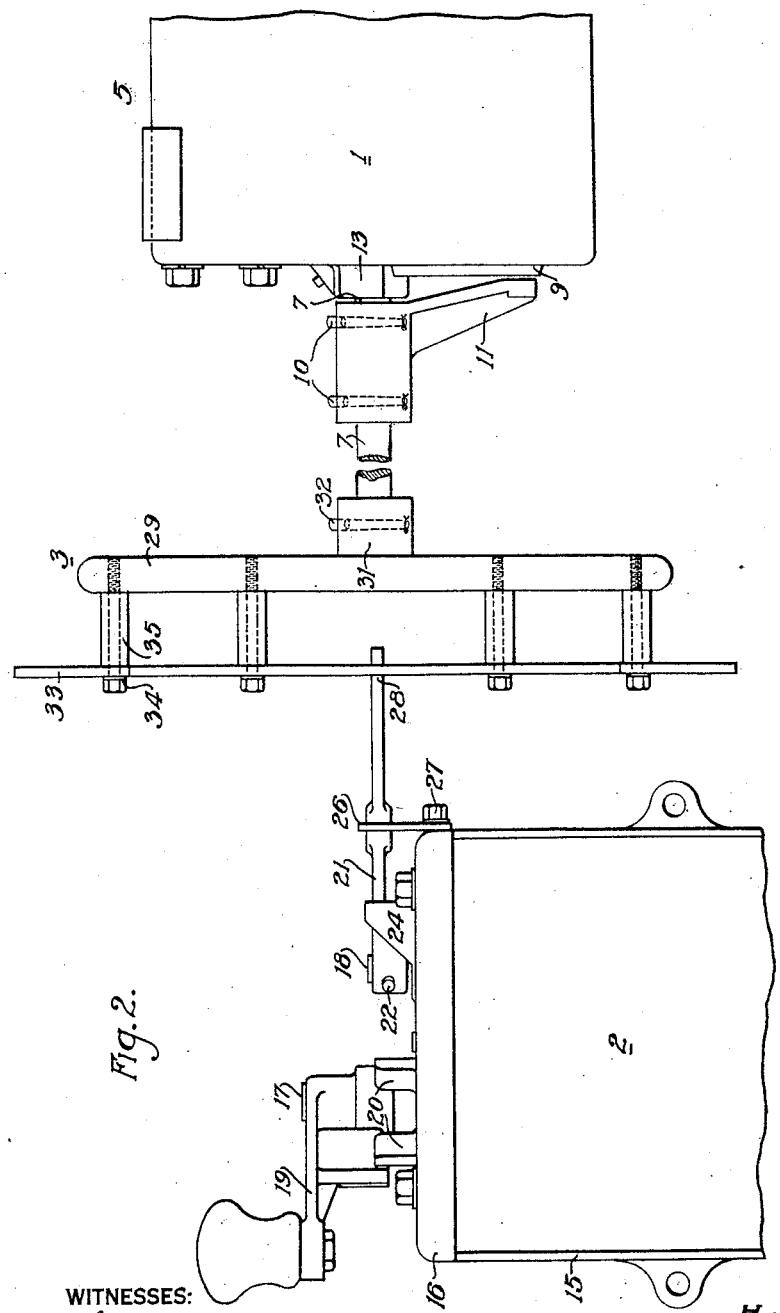

Sept. 30, 1924.                                    1,509,954
                    H. H. JOHNSTON
                    CONTROL APPARATUS
                 Filed March 11, 1919        3 Sheets-Sheet 3

WITNESSES:                                  INVENTOR
Geo. D. Barrett                          Howard H. Johnston.
W. P. Coley                              BY
                                         Wesley G. Carr
                                              ATTORNEY Patented Sept. 30, 1924.

1,509,954

UNITED STATES PATENT OFFICE.

HOWARD H. JOHNSTON, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CONTROL APPARATUS.

Application filed March 11, 1919. Serial No. 281,933.

*To all whom it may concern:*

Be it known that I, HOWARD H. JOHNSTON, a citizen of the United States, and a resident of Edgewood Park, in the county of Allegheny and State of Pennsylvania, have invented a new and useful Improvement in Control Apparatus, of which the following is a specification.

My invention relates to control apparatus for dynamo-electric machines and it has special relation to the mechanical interlocking of certain pieces of control apparatus.

One object of my invention is to provide a rotatable member, such as a master controller, and a second rotatable member, such as a main-circuit combined reverser and series-parallel controller, which is remotely located with respect to the master controller, together with a simple and effective mechanical interlocking means between the two control devices.

More specifically stated, it is the object of my invention to provide interlocking means for preventing undesirable relative operation of the above-indicated control apparatus without employing gear - wheels, a combination of links and levers or other complicated mechanism.

Other minor objects of my invention will become evident from the following detailed description, taken in conjunction with the accompanying drawings, wherein—

Figure 1 and Fig. 2 are views in plan and in front elevation, respectively, of control apparatus constructed and arranged in accordance with my present invention.

Fig. 5 is a perspective view of the entire combination of apparatus, and

Fig. 6 is a sectional view taken along the line VI—VI of Fig. 5.

Figure 4:
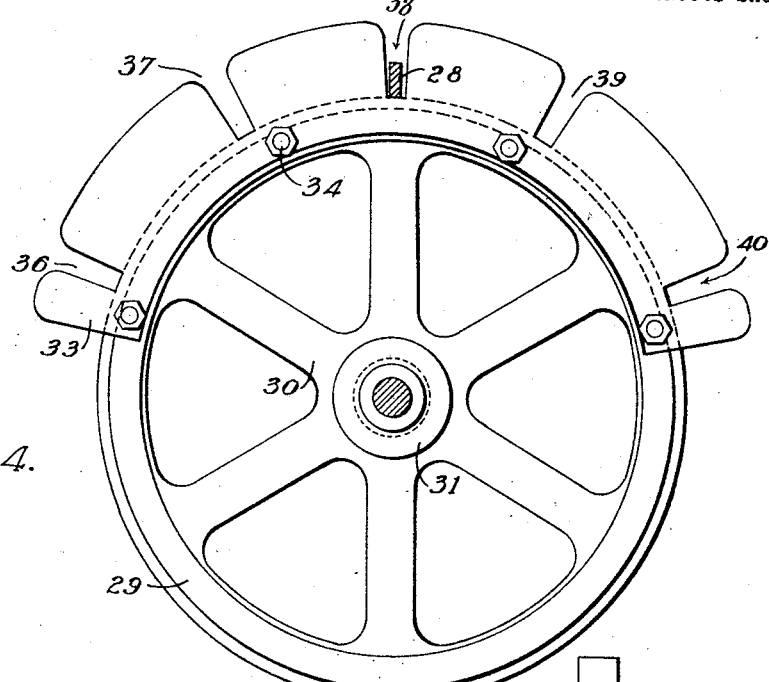
Fig. 3 and Fig. 4 are end views of certain parts of the apparatus, taken along the lines III—III and IV—IV, respectively, of Fig. 1.
Figure 3:
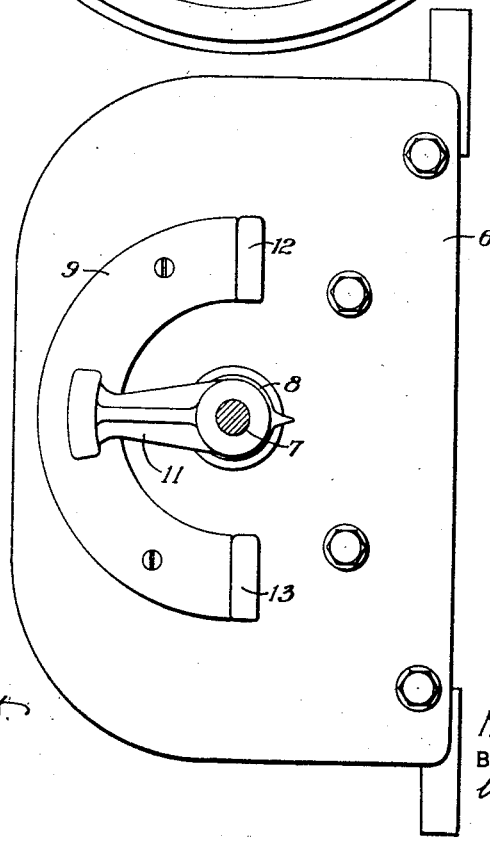

Referring to the drawings, the apparatus here shown comprises a main-circuit controller 1, which, in the present case, is a combined reverser and series-parallel controller; a master controller 2; and an interlocking mechanism 3 for preventing certain undesirable relative operations of the main reverser 1 and the master controller 2.

The present invention is particularly adapted for use in mining locomotives where space is at a premium and unusual locations of the various pieces of control apparatus are necessary. In the present instance, the main-circuit reverser 1 is adapted to be located beyond the operating platform upon which the master controller 2 is placed, although the interlocking mechanism 3 is located within easy reach of the locomotive operator for the purpose of manually positioning the main-circuit reverser 1, as hereinafter more fully described.

The main-circuit reverser 1 is adapted to combine the functions of a reversing switch for interchanging the connections of the armatures and field windings of the locomotive motors and of arranging the motor circuits for either series or parallel operation, as indicated by the various legends and arrows in Fig. 5. The reverser comprises the familiar encasing member or front cover 5; a top plate or cover member 6, and an operating shaft 7 upon which the contact-carrying drum (not shown) is mounted, as will be understood. A position-indicating and limiting member 8 has a laterally extending arm 11 that swings over a semi-annular plate 9, being secured to the shaft 7 by means of suitable taper pins 10. The ends of the semi-annular plate 9 comprise abutments or stops 12 and 13 for engaging the outer end of the arm 11 to limit the movement of the main-circuit reverser when operated by the interlocking mechanism 3, as more fully described later.

The master controller 2 comprises the customary front cover or casing member 15; a top plate or cover member 16; and operating shafts 17 and 18 corresponding, respectively, to the master controller drum proper and the master reverser. A suitable operating handle 19 is detachably secured to the controller shaft 17 and is adapted to be operated, through a series of positions, between the limiting stops or lugs 20, in accordance with a familiar practice.

An operating bar or handle 21 is secured, by means of a taper pin 22, to the outer end of the master-reverser shaft 18 and is limited, in its rotative travel, by means of a plurality of suitably located abutments or stops 23 and 24. An intermediate portion 25 of the operating bar 21 is thickened for the purpose of resisting wear and of providing a suitable guiding surface within the laterally-extending slot of a guide or template member 26, which is uprightly secured to the top cover member 16 by means of a plurality of bolts 27.

The outer end 28 of the operating bar 21 is laterally offset with respect to the main portion of the bar for the purpose of engaging a co-operating portion of the interlocking mechanism 3 at substantially right angles, as hereinafter more fully described.

The interlocking mechanism 3 comprises a hand-wheel 29 having a rounded rim and a plurality of interior spokes or arms 30 that radiate from a central hub 31 which is secured, by means of a taper pin 32, to the operating shaft 7 of the main-circuit reverser 1 or to an extension of that shaft. A semi-annular notched plate 33 is secured to one side of the rim of the hand-wheel 29 through the agency of suitable bolts 34, a plurality of collars or spacing members 35 being interposed between the plate 33 and the hand-wheel 29 to provide suitable operating space for the hand of the locomotive operator.

The interlocking plate 33 is provided with a plurality of radially-extending peripheral notches 36 to 40, inclusive, which, as clearly shown in Fig. 5, correspond to Reverse-Parallel, Reverse-Series, Off, Forward-Series and Forward-Parallel operation of the hand-wheel 29 and, therefore, of the mechanically associated main-circuit reverser 1. As indicated by the cross-hatched rectangle in Fig. 4, the end portion 28 of the operating bar 21 for the master reverser is adapted to be inserted at right angles in the various notches of the interlocking plate 33, whereby undesirable movement of the main-circuit reverser with respect to the master reverser and also with respect to the master controller proper, is prevented, in a manner to be set forth.

Referring to Fig. 5 and Fig. 6, the operating shaft 17 of the master controller 2 has mounted upon it, within the encasing member 15, a contact-carrying drum 45 of a familiar type for governing any desired set of auxiliary motor-controlling circuits. A notched collar 46 is rigidly secured to the operating shaft 17, and a co-operating notched member 47 is fastened to the master-reverser shaft 18, while an interlocking arm or lever 48 is provided for mechanically joining the collars 46 and 47, under certain operating conditions. A bracket or lug 49 is secured to the rear plate or base 50 of the controller 2, and a suitable spring 51 has its ends attached respectively to the bracket 49 and to the interlocking lever 48 for the purpose of biasing the lever toward its position of engagement with the collar 47 of the master reverser. The collar 46 for the master controller shaft 17 is provided with a notch 52 which engages a projection of the interlocking lever 48 in the Off position of the controller. Similarly, the master-reverser collar 47 is provided with a relatively shallow notch 53 and a deeper notch 54 respectively corresponding to neutral and operating positions of the master-reverser operating handle or bar 21.

In the position that is illustrated in Fig. 6, the master controller proper 45 occupies its Off position, while the master-reverser device occupies its neutral position. Under these conditions, the interlocking lever 48 engages the notches or recesses 52 and 53, thereby positively preventing operation of the control drum 45 until the master-reverser shaft 18 is actuated into a position wherein the relatively deep notch 54 is engaged by the interlocking lever 48, whereby the spring 51 effects withdrawal of the lever from the notch 52 of the collar 46.

The relatively deep or operating notch 54 of the master-reverser collar 47 corresponds to the illustrated interlocking position of the operating bar or handle 21, while the relatively shallow notch 53 corresponds to the alternative position of the bar 21, wherein it is swung free of the interlocking plate 33. Consequently, the hand-wheel 29 may be operated to vary the position of the main reverser and series-parallel controller 1 only when the master-controller drum 45 occupies its Off position.

The operation of the entire illustrated interlocking apparatus may be briefly set forth as follows. When the master-controller drum 45 and the master-reverser shaft 18 occupy the respective Off and neutral positions that are illustrated in Fig. 6, whereby the operating bar 21 occupies a position out of engagement with the interlocking plate 33, the hand-wheel may be turned by the locomotive operator to any desired position corresponding to the direction and speed of operation that he desires. The stops 12 and 13 serve to prevent movement beyond the "Parallel" position in either direction. The master-reverser operating bar 21 is then thrown to its operative position corresponding to the relatively deep notch 54 of the collar 47 and also corresponding to the introduction of the end portion 28 of the operating bar into the proper notch of the interlocking plate 33, whereby further movement of the main-circuit reverser 1 by the hand-wheel 29 is positively precluded. The master-controller operating handle 19 may then be rotated to control the desired circuits.

It will be seen that I have thus provided a relatively simple and reliable mechanical interlocking means, not involving the use of a train of gears or a series of links and levers, for preventing undesirable relative operation of a platform-mounted master controller and a remotely-located combined main-circuit reverser and series-parallel controller.

I do not wish to be restricted to the specific structural details or arrangement of parts herein set forth, as various modifications thereof may be made without departing from the spirit and scope of my invention. I desire, therefore, that only such limitations shall be imposed thereupon as are indicated in the appended claims.

I claim as my invention:

1. The combination with two rotatable members having transversely extending axes, of single operating means for one of said members, and multi-position means rigidly secured to the other member for directly interlocking with said single operating means in various positions of said multi-position means to prevent movement thereof.

2. The combination with two rotatable members, of an operating lever for one of said rotatable members, and a manually operable member secured to the other rotatable member and having a plurality of notches to be alternatively engaged by said lever directly, to prevent movement of said other rotatable member.

3. The combination with two transversely extending shafts, of an operating handle for one of said shafts, and a hand-wheel device secured to the other shaft and having a plurality of notches to be alternatively engaged by said handle to prevent movement of said other shaft.

4. The combination with two transversely extending controller shafts, of an operating handle for one of said shafts, a hand-wheel secured to the other shaft, and a plate attached to said hand-wheel and having a plurality of peripheral notches to be alternatively engaged by said handle to lock said other shaft in a selected position.

5. The combination with two multi-position control drums materially spaced apart and having operating shafts, said drums respectively corresponding to master-reverser and main-reverser operation, of an operating handle for the master-reverser shaft, and means movable with the main-reverser shaft to be engaged by said handle for preventing movement of the main-reverser drum.

6. The combination with two multi-position control drums materially spaced apart and having operating shafts, said drums respectively corresponding to master-reverser and main-reverser operation, of an operating handle for the master-reverser shaft, and a manually operable member secured to the main-reverser shaft and having a plurality of notches to be alternatively engaged by said handle to prevent movement of the main-reverser drum.

7. The combination with two multi-position control drums materially spaced apart and having operating shafts extending at right angles, said drums respectively corresponding to master-reverser and main-reverser operation, of an operating handle for the master-reverser shaft, a hand-wheel secured to the main-reverser shaft, and a plate attached to said hand-wheel and having a plurality of peripheral notches respectively corresponding to the main-reverser drum positions to be alternatively engaged by said handle.

8. The combination with three rotatable members, of an operating handle for the first of said members, multi-position means secured to the second member for interlocking with said handle in various positions of said means to prevent movement thereof, and means responsive to the position of said first member for preventing movement of either of the other members.

9. The combination with three rotatable members, of an operating handle for the first of said members, a manually operable member secured to the second rotatable member and having a plurality of notches for alternatively engaging said handle to prevent movement of said second member, and means for preventing movement of the third member unless the first rotatable member occupies a predetermined position.

10. The combination with three rotatable members, of an operating handle for the first of said members, a hand-wheel device secured to the second member and having a plurality of notches for alternatively engaging said handle to prevent movement of said second member, and means for further preventing movement of the second member unless the third rotatable member occupies a predetermined position.

11. The combination with three rotatable members, of an operating handle for the first of said members, a hand-wheel device secured to the second member and having a plurality of notches for alternatively engaging said handle to prevent movement of said second member when said first member occupies a certain position, and means for preventing movement of the third rotatable member when said first member occupies another position.

12. The combination with three operating shafts, two extending parallel and the third extending transversely to them, of an operating handle for one of the parallel-extending shafts, a hand-wheel secured to the transversely-extending shaft, a plate attached to said hand-wheel and having a plurality of peripheral notches for alternatively engaging said handle to lock said transversely-extending shaft in a selected position, and interlocking means for preventing movement of one of the parallel-extending shafts when the other occupies a predetermined position.

13. The combination with three plural-position rotatable shafts respectively corresponding to master-reverser, main-reverser and master-controller operation, of an operating handle for the master-reverser shaft, a manually operable member secured to the main-reverser shaft and having a plurality of notches for alternatively engaging said handle to prevent movement of that shaft, and means for further preventing movement of that shaft unless the master-controller shaft occupies a predetermined position.

14. The combination with three plural-position rotatable shafts, two extending parallel and the third extending transversely to them, said members respectively corresponding to master-reverser, main-reverser and master-controller operation, of an operating handle for the master-reverser shaft, a manually operable member secured to the main-reverser shaft and having a plurality of notches for alternatively engaging said handle to prevent movement of that shaft when the master-reverser shaft occupies a certain position, and interlocking means for preventing movement of the master-controller shaft when said master-reverser shaft occupies another position.

In testimony whereof, I have hereunto subscribed my name this 26th day of Feb. 1919.

HOWARD H. JOHNSTON.